July 13, 1937.  E. S. EVANS  2,086,706
CAR LOADING DEVICE
Filed April 6, 1933  2 Sheets-Sheet 1

INVENTOR.
Edward S. Evans.
BY
Harness, Dickey, Pierce & Hann.
ATTORNEYS.

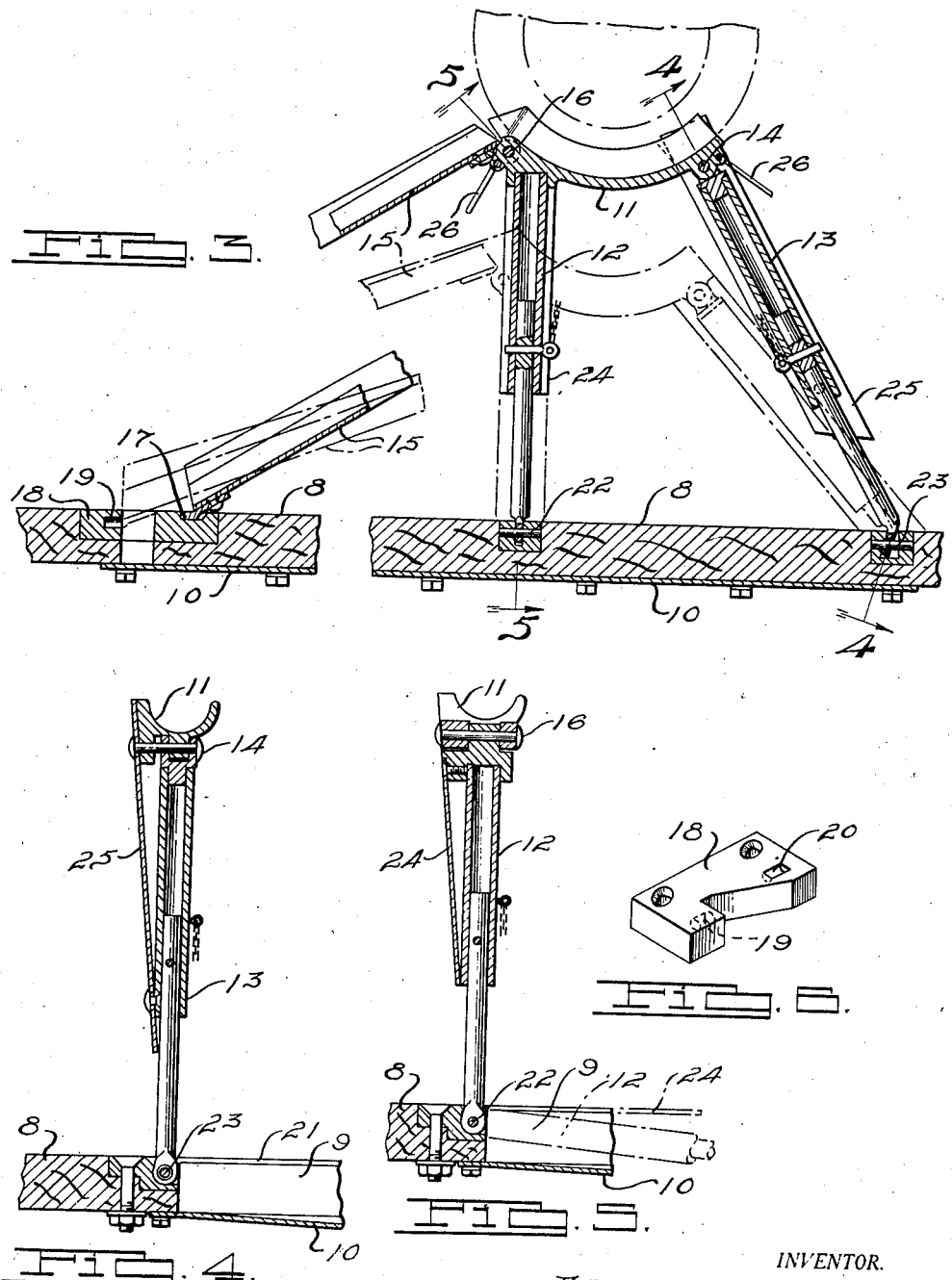

Patented July 13, 1937

2,086,706

UNITED STATES PATENT OFFICE 2,086,706

CAR LOADING DEVICE

Edward S. Evans, Detroit, Mich., assignor to The Worth Company, a corporation of Michigan Application April 6, 1933, Serial No. 664,735

9 Claims. (Cl. 105—368)

This invention relates to devices for loading automobiles in freight cars or the like.

The main objects of this invention are to provide an improved device for raising and securing an automobile in a freight car during shipment; to provide an improved device of this character by the use of which the automobile may be brought to an elevated position more quickly than with existing devices; and to provide an improved device of this character which may be folded into slots or openings provided in the car floor for storage purposes.

An illustrative embodiment of this invention is shown in the accompanying drawings, in which—

Fig. 3 is an enlarged fragmentary sectional detail of one of the wheel supporting cradles in elevated position taken on the line 3—3 of Fig. 2.

Fig. 4 is a sectional view taken on the line 4—4 of Fig. 3.

Fig. 5 is a sectional view taken on the line 5—5 of Fig. 3.

Fig. 6 is a view in perspective of the ramp mounting and supporting block.

Figure 1:
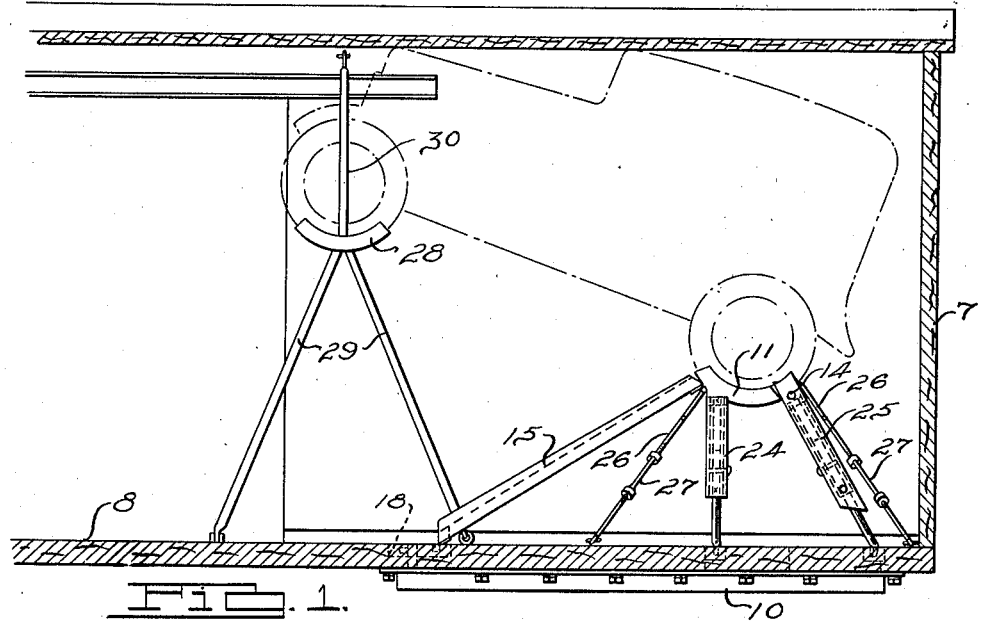
Figure 1 is a fragmentary view in vertical longitudinal section of a freight car equipped with the improved car loading device in operative position.
Figure 2:
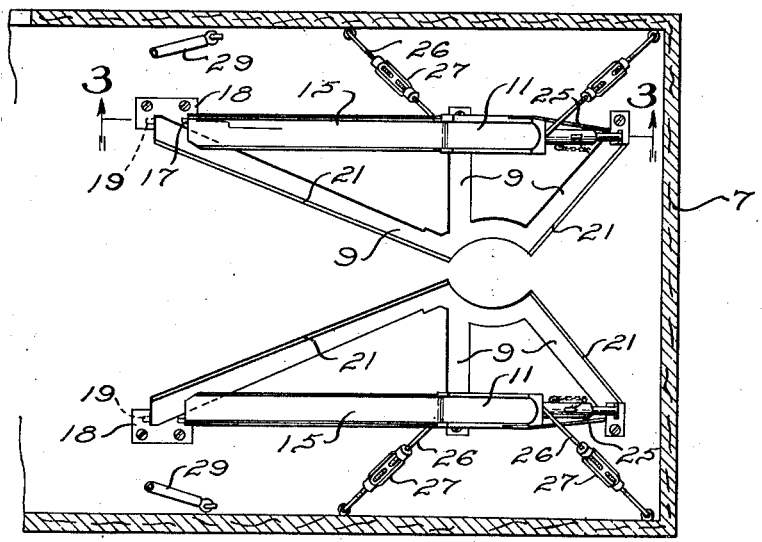
Fig. 2 is a plan view of the same.

In the construction shown in the drawings, a freight car generally designated 7 is provided with a floor 8, which has a series of slots or openings 9 therein which pass through the floor. The underside of the floor is provided with a pan 10 bolted thereto which serves as a closure for the openings 9, the bottom of the pan toward the middle thereof being in spaced relation to the underside of the floor in order to provide additional depth for storage purposes.

The improved car loading device comprises an automobile wheel supporting cradle 11 which is attached to the floor of the freight car by extensible legs 12 and 13. The leg 12 is vertical with respect to the plane of the car floor when in upright position but the leg 13 is inclined rearwardly with respect to the wheel cradle for the purpose of taking longitudinal stresses to which the cradle is subjected during movement of the freight car in starting, stopping and switching.

Both the legs 12 and 13 are of telescoping character, comprising an outer tubular casing in which is axially slidable a rod or tube, the lower ends of which are pivoted to the freight car floor on longitudinally extending trunnions, so that the cradle and legs may be swung laterally toward the center of the car and be housed within the openings or slots 9 in the car floor.

The upper end of the slanting leg 13 is pivotally secured to a cradle by a pin 14 inasmuch as the angle between the cradle and this leg changes when the cradle is moved from the position shown in full lines to the position shown in dotted lines in Fig. 3 of the drawings.

The front end of the cradle 11 has a ramp 15 pivoted thereto on a pin 16, which ramp is in the form of a relatively broad, shallow channel with the lower end thereof provided with a trunnion 17.

The floor 8 of the freight car is recessed to receive a block 18 flush with the top surface thereof, which block is provided with a trunnion socket 19 in which the trunnion 17 may pivot and a socket or seat 20 in longitudinally spaced relation to the socket 19 for receiving the trunnion 17 when the cradle is in its fully elevated position, as shown in full lines in Fig. 3.

The outer sides of the cradle supporting legs 12 and 13 are provided with strips or plates 24 and 25 respectively, of greater width than the legs and of properly sufficient width to fully close the slots or openings 9 in the floor when the cradle legs and ramp are folded or moved into the slots for storage purposes. The sides of the slots are preferably formed to provide seats 21 for receiving and supporting the marginal edges of some of these plates so as to insure that the plates will be flush with the floor of the car when the equipment is in its housed or stored position.

The trunnion 17 and pivot pins 22 and 23 for the lower ends of the legs 12 and 13 respectively, are all in axial alignment so that the supporting legs, cradle and ramp may all be pivoted longitudinally to be moved into their respective openings in the car floor.

The plate 25, as shown in Fig. 4 of the drawings is pivoted to the cradle at its upper end so that relative movement therebetween is provided when the cradle is moved from the position shown in full lines to that shown in dotted lines in Fig. 3.

Means are provided for holding the cradles in upright position and comprise brace rods 26, one end of which is detachably attached to the cradle and the opposite end of which is anchored to the freight car closely adjacent the junction of the side wall and floor. Brace rods 26 are preferably provided with turn-buckles 27 for tightening them.

After the rear wheels of the automobile have been positioned in the supporting cradles 11, the front end of the car may be raised by any suitable means such as chain falls or the like, and supported in a cradle 28 mounted by a downwardly and outwardly extending V-brace 29 and a brace rod 30 which extends upwardly from the cradle to a point adjacent the junction of the roof and side wall of the freight car. The front wheels of the automobile in this position are at a higher elevation than the rear wheels thereof.

In the operation and use of this car loading equipment, the cradles with their respective supporting legs and ramps, are rotated on their respective pivots to an upright position and then the telescoping legs extended and secured by pins in the position shown in full lines in Fig. 3 of the drawings. As the cradle is raised to this position, the free end of the ramp 15 is withdrawn from the socket 19 and the trunnions 17 placed in the socket 20, thus holding the lower end of the ramp in position on the floor in correctly spaced relation with respect to the cradle and the other ramp. The cradles, supporting legs and ramps are secured in upright position by the brace rods 26 and tightened by the turnbuckles 27.

The automobile is then backed up the ramp, preferably under its own power, until the rear wheels are in position in the cradles 11.

The front end of the automobile is then raised by any suitable means, such as chain falls, and secured in such position by placing the front wheels in the shoes or cradles 28, which are supported by the brace rods 29 and 30.

Although but one specific embodiment of this invention has been shown and described, it will be understood that numerous details of the construction shown may be altered or omitted without departing from the spirit of this invention as defined by the following claims.

I claim:

1. In combination, a freight car having a floor, a pair of laterally spaced cradles in elevated position above said floor for receiving the wheels of and supporting one end of an automobile, said cradles being hinged adjacent the floor whereby said cradles may be moved downwardly adjacent the floor for storage purposes, and a pair of ramps having one of their ends at the floor and their other ends at the cradles whereby the wheels of the automobile may be run up the ramps and into the cradles.

2. In combination, a freight car having a floor, said floor having a series of openings therein, a pair of laterally spaced cradles in elevated position above said floor for receiving the wheels of and supporting one end of an automobile, said cradles being hinged adjacent the floor and movable into said floor openings for storage purposes, and a pair of ramps having one of their ends at the floor and their other ends at the cradles whereby the wheels may be run up the ramps and into the cradles.

3. The combination of a freight car having a floor, said floor having an opening therein, a cradle pivotally attached to said freight car adjacent said floor opening for supporting the wheel of an automobile, said cradle being movable into said floor opening for storage purposes, and a plate fixed with respect to said cradle for covering said floor opening when the cradle is moved thereinto.

4. In combination, a freight car having a floor, said floor being provided with a series of openings therein, a pair of laterally spaced cradles in elevated position above said floor for receiving the wheels of and supporting one end of an automobile, supporting legs on said cradles, said supporting legs being extensible for varying the respective lengths thereof and being hinged to said freight car adjacent the floor openings and so aligned with the floor openings that the cradles, with extensible supporting legs thereof in retracted positions, are movable into said floor openings for storage purposes.

5. In combination, a freight car having a floor, said floor being provided with transverse openings and openings connected to but arranged in angular relation with respect to said transverse openings, and a pair of laterally spaced cradles, means for supporting said cradles, said supporting means comprising angularly related members connected to the cradles and hinged to the car adjacent said openings and in such alignment therewith that the cradles and supporting means are movable from load supporting position to a position wherein the cradle and supporting member occupy the transverse and angularly disposed openings.

6. In combination, a freight car having a floor, a pair of laterally spaced cradles for receiving the wheels and supporting one end of an automobile, supporting legs for said cradles pivotally connected to the car adjacent the floor thereof and adapted, when in elevated position, to support said cradles in elevated position above the floor, said legs having means to extend the same for varying the height of the cradles above the floor, and openings in the floor of the car shaped to receive the cradles and supporting legs and so positioned adjacent and in alignment with the cradles and supporting legs that they will receive said cradles and supporting legs when the latter are swung downwardly from elevated position about said pivotal connection.

7. In combination, a freight car having a floor, a member adapted to receive and support one wheel of an automobile, strut means pivotally connecting said member to the freight car whereby said member is movable from a load supporting position wherein the strut means extends vertically and the member is substantially above the floor of the car to an inoperative position wherein said member and means are below the plane of the floor, said floor having an opening shaped and positioned to receive said member and means when in said inoperative position, said member and means having flat surfaces at one side thereof adapted, when said member and means are in inoperative position, to cover and close the floor opening.

8. In combination, a freight car having a floor, a member adapted to engage and support a portion of the contents of the car, a plurality of struts pivotally connecting said member to said freight car, said connecting struts being adapted to move said member from a load supporting position above the floor level wherein the struts lie in a common vertical plane into an inoperative position below the floor level, an opening in said floor adapted to receive said member and struts when in inoperative position, and plate means attached to said member for covering said opening when said struts are in inoperative position.

9. In combination, a freight car having a floor, a member adapted to receive and support one wheel of an automobile, means movably connecting said member to the freight car whereby said member is movable from a load supporting position substantially above the floor of the car to an inoperative position below the plane of the floor, a ramp having one end at the floor and the other end secured to said member whereby a wheel may be run up said ramp onto said member when the latter is in elevated position, and an opening in said floor shaped and positioned to receive said member, means and ramp when in said inoperative position.

EDWARD S. EVANS.